July 18, 1950 K. J. PTASNIK 2,515,423
TAPE WITH ADHESIVE AND NONADHESIVE AREAS
Filed July 31, 1945 2 Sheets-Sheet 1

INVENTOR.
KELMAN JOSEF PTASNIK.
BY
Leon M. Strauss
Agt.

July 18, 1950 K. J. PTASNIK 2,515,423
TAPE WITH ADHESIVE AND NONADHESIVE AREAS
Filed July 31, 1945 2 Sheets-Sheet 2

INVENTOR.
KELMAN JOSEF PTASNIK.
BY

Patented July 18, 1950

2,515,423

UNITED STATES PATENT OFFICE 2,515,423

TAPE WITH ADHESIVE AND NONADHESIVE AREAS

Kelman Josef Ptasnik, New York, N. Y.

Application July 31, 1945, Serial No. 607,948

1 Claim. (Cl. 117—44)

This invention relates to adhesive tape structures and more particularly to improvements in or relating to the manufacture of pressure-sensitive adhesive tapes.

Adhesive tapes generally have a cellulosic base, such as paper, or the base of the adhesive tape is made of a material derived from a cellulosic plastic composition, such as cellulose acetate, cellulose nitrate, cellulose ethylate, cellulose benzylate, etc. or may be made from a synthetic resin plastic mass, e. g. of the vinyl resin group or hydroxycarboxylic resin group or of resinous mass of the hydrochloric or other synthetic rubber groups.

Other pressure-sensitive adhesive tapes have a fabric base made from cotton, wool, felt, silk or artificial silk.

These bases or carriers are coated with an adhesive layer which generally consists of mixtures of natural rubber or synthetic rubber with waxes or resins and apportionate additions of a plasticizer to keep the adhesive layer permanently tacky.

One of the main problems arising out of the production of pressure-sensitive adhesive tapes is to prevent the adhesive layer from offsetting or sticking in part to the opposite or top surface of its base or carrier since this would at least partially destroy the purpose and adhesive faculty of the adhesive tape. The top or front surface of the tape will be smeared instead of remaining clean and free from any adhesive parts or particles.

Many propositions have been made to overcome these and other difficulties.

One suggestion is to interpose between the front and rear side of the adhesive tape when being rolled up a waxed paper lining. Such lining, however, tends to soften or to deteriorate the properties of the adhesive layer and a result thereof will be a weakened adhesive tape or carrier. Such lining forms a waste for the ultimate user of the adhesive tape since the user when applying the adhesive tape, must first separate the lining from the adhesive tape and then discard this lining.

Another suggestion has been made to the effect of specifically treating the adhesive layer carrying tape. The top surface of the tape was coated to produce repellency of said surface with respect to the adhesive layer provided on the underface of the tape. This treatment of the adhesive tape, however, was not found satisfactory since during storage of the adhesive tape the coating reacted with or dissolved the adhesive layer, particularly under changing atmospheric conditions.

The present invention does away with these and other deficiencies and disadvantages inherent in the heretofore known pressure-sensitive adhesive tapes. The invention deals more particularly with the production of pressure-sensitive adhesive tape which may be so prepared that the adhesive faculty of the tape is substantially maintained.

It is therefore one of the objects of this invention to provide means affording a predetermined degree of insulating effect between the pressure-sensitive adhesive layer and the clean top surface of the tape or carrier regardless of any atmospheric or other destructive influences.

It is another object of the present invention to provide means cooperable with the underface receiving the adhesive layer and/or with the top surface of the tape or carrier structure whereby undisturbed, speedy and ready application of the adhesive tape is facilitated for any purpose intended.

It is still a further object of the present invention to provide means for depositing intermittently or continuously indicia or markings either on the adhesive layer and/or its opposite side or surface of the carrier which is free from any adhesive layer to thereby achieve during the processing stage or upon storage the transfer of such indicia or markings onto the adhesive layer side of the tape, whereby a simplified process is obtained which is inexpensive and very efficient as to the results aimed at.

It is a still further object of the present invention to ensure satisfactory adhesive qualities of the tape or carrier without impairing in any way its flexibility although the adhesive layer has embedded therein markings of configurations of predetermined minute size.

Still another object of the present invention is to provide means influencing the continuity of the extent of the adhesive layer on the tape without substantially impairing the transparency and appearance of the adhesive tape if the same is of the transparent type.

Yet, a further object of the present invention is to provide means in the form of pin points, dots, fine lines either in parallel or in crosswise arrangement, etc. in the adhesive layer of the tape structure which enhances the decorative effect of such structure, facilitates its unrolling and avoids tearing of the lateral edges of the tape.

A still further object of the present invention is to provide means for transferring during the manufacturing stage and/or immediately before use of the tape indicia of any desired shape or configuration either directly or indirectly onto its adhesive layer whereby to obtain broken or interrupted insulating planes or areas on said adhesive layer.

These and other objects and advantages will become more apparent from the ensuing description of the invention, and will be further clearly understood by referring to the accompanying drawings.

Figure 1:
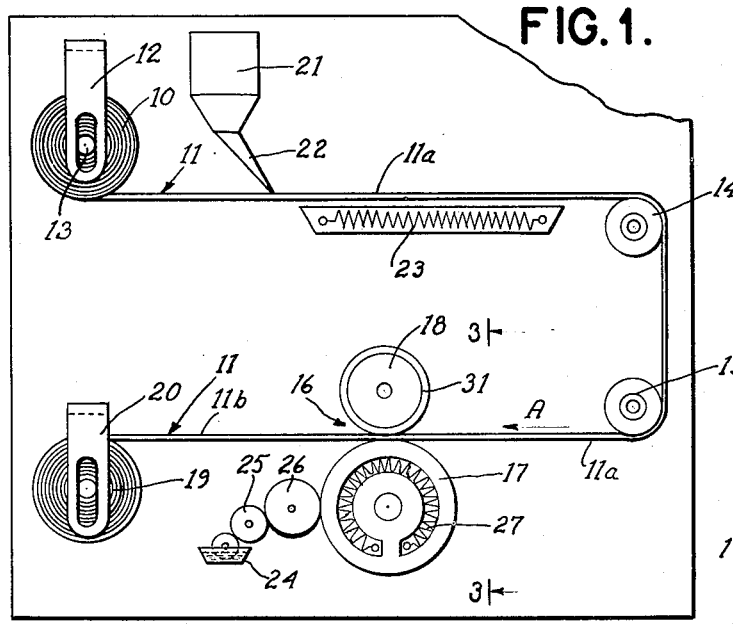
Fig. 1 is a view in side elevation of one of the embodiments showing in diagrammatic form how the process according to the present invention may be realized.

Referring now more particularly to the drawings, there is shown in Fig. 1 a reel 10 provided with endless tape 11 which is suitably supported on frame 12 for rotation about shaft 13. Tape 11 is trained over guide rollers 14 and 15 to a printing unit 16 consisting of a main drum 17 and a pressure roller 18 between which tape 11 is subjected to pressure and tension and then wound up on reel 19 supported by frame 20.

Figure 3:
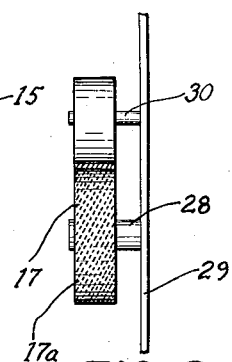
Fig. 3 is a view in side elevation taken along line 3—3 of Fig. 1.

Before tape 11 passes over roller 14, a suitable adhesive binder or layer, preferably of the pressure-sensitive type, is supplied thereto from a tank or container 21 which is equipped with a suitable and known spreader 22. After the adhesive layer has been applied to the surface 11a and across the entire width of tape 11, the layer during its advance movement is exposed to the influence of a dryer, preferably an electric dryer 23. Tape 11 when trained over guide rollers 14, 15 carries said applied adhesive in the form of a continuous or, if desired, intermittent layer on surface 11a. Tape 11 is moved further into the direction of arrow A and then passed through printing unit 16. Suitable indicia or markings 17a (Figs. 3 and 4), such as dots or fine lines which come off very easily from the polished drum surface 17, are supplied to the surface of printing drum 17 from an ink container 24 through known spreading and printing rollers 25, 26, the latter producing or causing predetermined markings on the surface of drum 17. Drum 17 is further provided with an electric heating unit 27 by which the indicia 17a applied to the surface of drum 17 are dried.

As will be later explained, these indicia or markings are of such nature and made of pellicular material that they may be easily taken or peeled off from the polished drum surface.

Drum 17 is rotatably supported by shaft 28 which in turn is journalled on frame 29 of a suitable machine. Roller 18 is journalled on a spindle 30 of frame 29 and presses by means of its yieldable or resilient layer 31, made e. g. of rubber, against the rear surface 11b of tape 11 which is pressed with its adhesive layer surface 11a against the indicia 17a of drum 17 to transfer said indicia to said tape. Tape 11 is then wound up on reel 19.

For the sake of clarity, any driving means (such as motor or hand-operated wheels) have been omitted.

Figure 2:
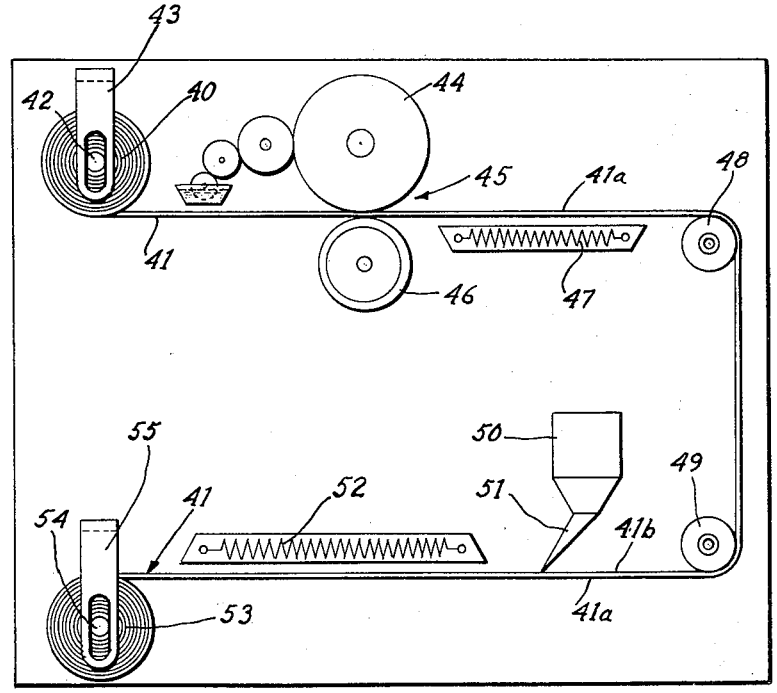
Fig. 2 is another embodiment, diagrammatically shown and similar to that of Fig. 1.

Fig. 2 shows a reel 40 carrying a roll of endless tape 41. Reel 40 is suitably supported by means of its spindle 42 on frame 43. Tape 41 passes under pressure and tension between printing unit 45 comprising the printing roller 44 and pressure roller 46. Printing unit 45 is constructed similar to printing unit 16. After indicia or markings similar to those described with reference to Fig. 1 have been applied to the surface 41a of tape 41, the same is subjected to the action of dryer 47 and then trained over guide rollers 48, 49. The rear surface 41b of tape 41 is then provided with an adhesive layer of the pressure-sensitive type supplied from tank 50 which is equipped with a suitable spreader 51. This adhesive layer is then dried under the influence of dryer 52, positioned between tank 50 and reel 53 for winding up tape 41. Reel 53 is supported by means of its spindle 54 on bracket or frame 55.

Figure 4:
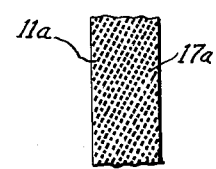
Fig. 4 is a detail view to which reference is had in the ensuing specification.

The result of the manufacturing process illustrated in connection with Fig. 1 is that a roll of endless, adhesive tape is obtained having the adhesive layer 11a with indicia or markings 17a, embedded therein, as it is apparent from Fig. 4.

It will be further understood that upon unwinding of tape 41 from reel 53 the indicia or markings deposited on top surface 41a are automatically transferred to the adhesive layer on rear face 41b.

Figure 5:
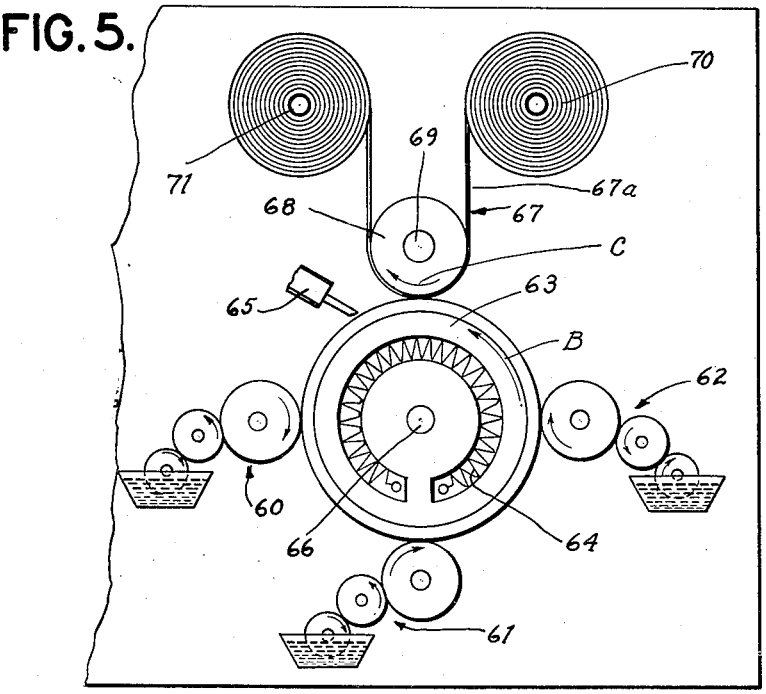
Figs. 5 and 6 show further embodiments of the invention, respectively, in diagrammatic form.
Figure 6:
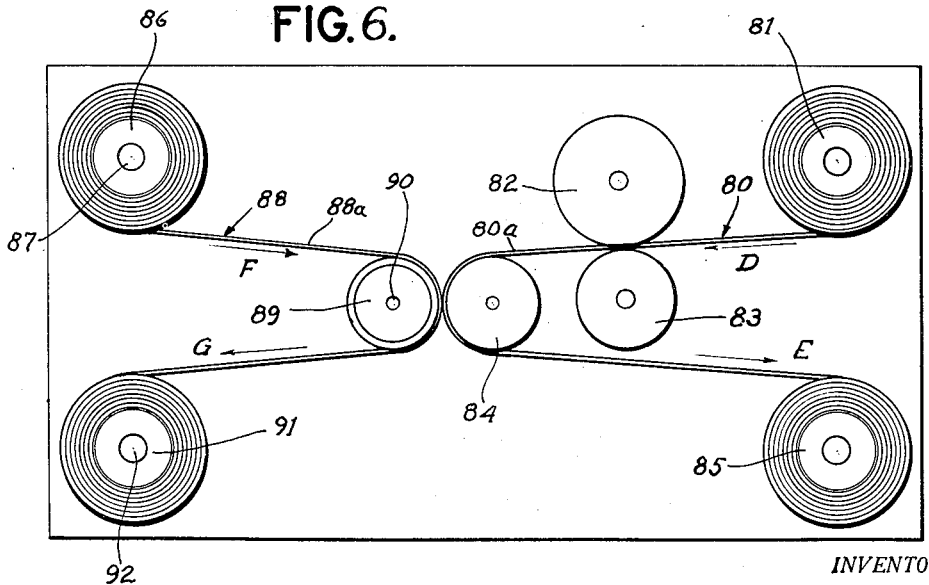

Fig. 5 shows the application of a set of three printing units 60, 61, 62 to drum 63 provided with a heating element 64. Since the printing units 60, 61, 62 may be arranged in staggered relation with respect to the smoothly polished surface of printing drum 63, different indicia with varying colors may be produced on the drum surface. A smoothing device 65 may be provided to clean and prepare for new indicia or markings on the surface of drum 63.

According to this invention, the printing drum 63 is moved in the direction of arrow B through shaft 66. An endles tape 67 is trained over pressure roller 68 and moved in the direction of arrow C by shaft 69. Tape 67 may be a conventional Scotch or similar adhesive tape caused to move by any known driving means (not shown) from reel 70 to reel 71 over said pressure roller 68. The adhesive surface 67a faces the surface of drum 63 to take off from the latter any suitable indicia or markings disposed thereat for this purpose by the printing units 60, 61, 62.

Fig. 7 shows a diagrammatic view of another embodiment to carry the process steps into effect.

A suitable endless tape 80, preferably made from "cellophane," is unwound from reel 81 and is guided in the direction of arrow D through the driving rollers 82, 83 and then trained over roller 84 to a reel 85 in the direction of arrow E. Tape 80, in this instance, replaces the printing drum 63 (Fig. 5), one face 80a of tape 80 being provided with an indicia carrying film or pellicular material of extreme thinness which can be readily peeled off, as hereinabove explained.

From reel 86 which is rotatably mounted on shaft 87, runs tape 88 in the direction of arrow F toward wheel or roller 89 adapted to rotate by means of shaft 90. Tape 88 is preferably of the transparent type (pressure-sensitive Scotch tape) having an adhesive layer 88a facing the film carrying layer 80a of tape 80. Pressure and tension between rollers 84 and 89 may be so calculated and regulated by any known set screws, that tape 80 under pressure moves against tape 88 whereby the very thin film coating on face 80a of tape 80 will be transferred during progress of tape 88 onto the adhesive layer thereof which is provided on face 88a. Tape 88 is then further transported in the direction of arrow G and collected or wound up on reel 91 driven by means of shaft 92. The wound up tape 88 now contains on its adhesive layer side 88a suitable markings, for example those shown in Fig. 4.

It is well understood that any dryer or heating elements may be arranged wherever needed.

It is well understood that the markings may be directed in any desired direction, either crosswise, inclined or straight over the entire width of tape.

As aforesaid, the indicia or markings herein referred to are made of a material which has the property to easily peel or come off from the supporting base, such as "cellopane," or highly polished steel surfaces. The markings may each consist of an utterly thin film or suitable pellicular material of non-adhesive character designed to be attached or incorporated at predetermined locations or points to the adhesive layer of the adhesive tape so as to make these points or locations ineffective and to reduce their adhesive faculty, whereas other areas of the adhesive layer are devoid of such markings so as to ensure satisfactory adhesive qualities of the tape, label or carrier.

In certain cases it may be of advantage to use colored or even pigmented materials for the indicia or markings with decorative or advertising motives.

The indicia or any layer part of parts possessing the aforesaid character of covering up adhesive layer areas and thus producing areas of substantially reduced adhesive power on the adhesive layer may be chosen from substances which are not susceptible to disintegration when coming in contact with the adhesive layer or coating.

The following substances have been found in practice to yield desirable results:

(1) About 15% by weight of nitro-cellulose are dissolved in approximately 85% by weight of acetone-ethyl acetate and small additions of a softening agent, such as tricresyl phosphate.

(2) About 10% by weight of ethyl cellulose mixed with about 90% by weight of alcohol-toluol with very small additions of dibutyl phthalate.

(3) About 10% by weight of acetyl cellulose mixed with 90% by weight of acetone with small additions of triphenyl phosphate.

It is well understood that any commercial aniline ink containing a slight amount of water and further any of the substances as disclosed in the aforesaid examples may be utilized for obtaining indicia or markings with the printing units on the printing drums.

Although the aforesaid examples show only cellulose derivatives and are designed to yield clear, transparent pre-shaped indicia or markings hardly noticeable on the adhesive layer, other substances may be used to bring about the effect aimed at by the present invention.

Proportionate quantities of coloring matter, pigments and appropriate binders, such as resinous solutions, may be employed to provide more discernible indicia and to serve the further purpose of achieving decorative or advertising media.

The indicia in the nature of an extremely fine film may have the thinness of ordinary printing media. The indicia may be applied to the adhesive layer from a printing unit, as hereinabove described. If roto-gravure printing is applied, a screen roller of an etching of 150 squares to the inch is held sufficient. However, the thickness of the indicia layer very often depends on the ingredients used for the formation of the indicia. If, e. g. pigmented indicia have to be produced, the indicia must of necessity be thicker than if only a transparent indicia layer is required.

The nature of the applied adhesive also plays a roll in determining the thickness of the indicia producing stratum.

As hereinabove seen, the application of the indicia or markings to the adhesive tape structure can be effected before, during or after the manufacture of the adhesive tape or labels.

The present invention further contemplates indicia made from or containing such material that it will not impair or interfere with the adhesive faculty of the adhesive layer of the tape when embedded therein. The printing ink material employed may be akin to the ingredients or constituents of which the adhesive layer consists so as to embed or incorporate the indicia in the adhesive layer in a less conspicuous manner.

In any event, the required properties of the adhesive tape as to its flexibility, easy handling, manipulation, etc. will not be changed or substantially affected.

Various tests made have proven that the process according to the present invention can be speedily and uninterruptedly realized with readily available machinery.

According to the present invention there has been provided a process of manufacturing tape structures having an adhesive layer on one surface thereof, which consists in depositing indicia or markings for contact with said adhesive layer, whereby said markings are incorporated for permanent connection in said adhesive layer so as to provide a multiplicity of active and substantially inactive relatively small areas on said adhesive layer said areas being substantially uniformly distributed over and being substantially equally spaced apart from each other on said layer so as to extend across the entire width of the tape and from one side edge to the opposite side edge thereof, whereby the adhesive layer is substantially equally divided into portions of reduced adhesive faculty and of full adhesive faculty.

Having thus described the invention, what is claimed as new and desired to be secured by Letters Patent is:

A tape having opposite side edges with an adhesive layer therebetween on one surface of said tape and markings of pellicular material placed on said layer; said markings comprising a multiplicity of relatively small areas of substantially similar configurations each adapted at its respective location on said adhesive layer to reduce a respective portion of the adhesive power of the adhesive layer, said areas being substantially equally spaced apart from each other on said layer so as to extend across the entire width of the latter from edge to edge, whereby the adhesive layer is equally divided into portions of reduced adhesive faculty and of full adhesive faculty.

KELMAN JOSEF PTASNIK.

REFERENCES CITED

The following references are of record in the file of this patent:

UNITED STATES PATENTS

| Number | Name | Date |
|---|---|---|
| 1,803,033 | Orr | Apr. 28, 1931 |
| 1,941,328 | Tone | Dec. 26, 1933 |
| 1,944,834 | Bennett | Jan. 23, 1934 |
| 2,000,475 | O'Donnell | May 7, 1935 |
| 2,078,790 | Bucy | Apr. 27, 1937 |
| 2,096,389 | Bode | Oct. 19, 1937 |
| 2,116,008 | Block | May 3, 1938 |
| 2,255,953 | Vergobbi | Sept. 16, 1941 |
| 2,302,179 | Bronfman | Nov. 17, 1942 |
| 2,341,583 | Tuve | Feb. 15, 1944 |
| 2,349,709 | Evans | May 23, 1944 |
| 2,381,605 | Leander | Aug. 7, 1945 |
| 2,386,731 | Wenzelberger | Oct. 9, 1945 |
| 2,404,073 | Karfiol et al. | July 16, 1946 |